United States Patent [19]
Wallenius

[11] Patent Number: 5,531,044
[45] Date of Patent: Jul. 2, 1996

[54] LANDSCAPE EDGING DEVICE AND METHOD

[76] Inventor: Ronald Wallenius, 6344 Cleveland, Merrillville, Ind. 46410

[21] Appl. No.: 334,150

[22] Filed: Nov. 4, 1994

[51] Int. Cl.⁶ .................................................. A01G 1/08
[52] U.S. Cl. ..................... 47/33; 404/7; 52/102
[58] Field of Search .................. 47/33; 404/7; 52/102

[56] References Cited

U.S. PATENT DOCUMENTS

| | | | |
|---|---|---|---|
| 3,485,449 | 12/1969 | Wilson . | |
| 3,762,113 | 10/1973 | O'Mullan | 47/33 |
| 3,933,311 | 1/1976 | Lemelson . | |
| 4,381,622 | 5/1983 | Spidell . | |
| 4,846,655 | 7/1989 | Gulley . | |
| 4,910,910 | 3/1990 | Jones | 404/7 |
| 5,077,944 | 1/1992 | Backman | 404/7 |
| 5,092,076 | 3/1992 | Terreta | 47/33 |
| 5,141,360 | 8/1992 | Zeman . | |
| 5,315,780 | 5/1994 | Thomas . | |
| 5,377,447 | 1/1995 | Fritch | 47/33 |
| 5,379,546 | 1/1995 | Popp | 47/33 |

FOREIGN PATENT DOCUMENTS

| | | | |
|---|---|---|---|
| 0406063 | 1/1991 | European Pat. Off. | 47/33 |
| 1422293 | 11/1965 | France | 47/33 |

*Primary Examiner*—Henry E. Raduazo
*Attorney, Agent, or Firm*—Mark E. Wiemelt

[57] ABSTRACT

This invention provides a landscape edging device (10) including a polyvinylchloride pipe (22) having longitudinally spaced bores (24) extending vertically therethrough and spikes (31) disposed to extend substantially vertically through the bores (24) and into the ground to secure the device (10) to the ground. The spikes (31) include head portions (32) and shank portions (34). The head portions (32) have larger outer head diameters (36) than the diameters (38) of the bores (24) and the shank portions (34) have outer shank diameters (39) smaller than the diameters (38) of the bores (24), whereby the bores (24) are adapted to receive the shank portions (34) and the head portions (32) cooperatively engage the elongated member (20) proximate the corresponding bores (24).

The invention also relates to an improved method of installing such a landscape edging device (10). The first step involves digging a trench (60) in the ground intermediate a first earth surface (52) and an adjacent earth surface (54). The second step involves covering the first earth surface (52) with a polymer sheet (50). Preferably, a portion of the polymer sheet (50) partially overlaps the adjacent earth surface (54). The third step involves resting an elongated member (20) on the ground intermediate the first earth surface (52) and the adjacent earth surface (54) to form a border between the first earth surface (52) and the adjacent earth surface (54). The next step involves anchoring the elongated member (20) to the ground. The final step involves removing the portion of the polymer sheet (50) partially overlapping the adjacent earth surface (54), if applicable.

9 Claims, 5 Drawing Sheets

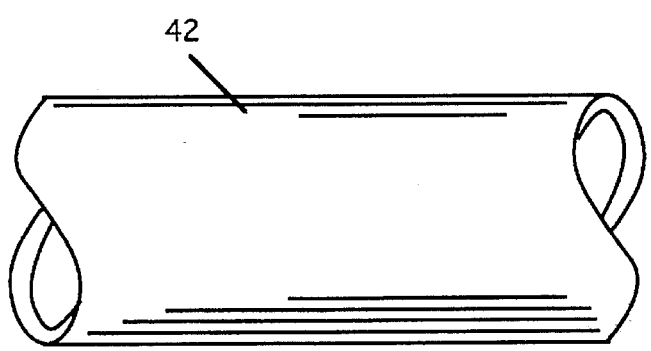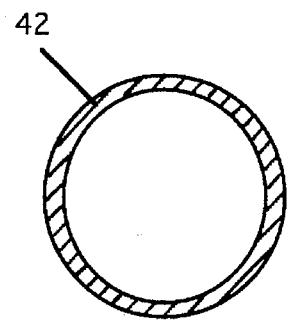
FIG. 6     FIG. 7
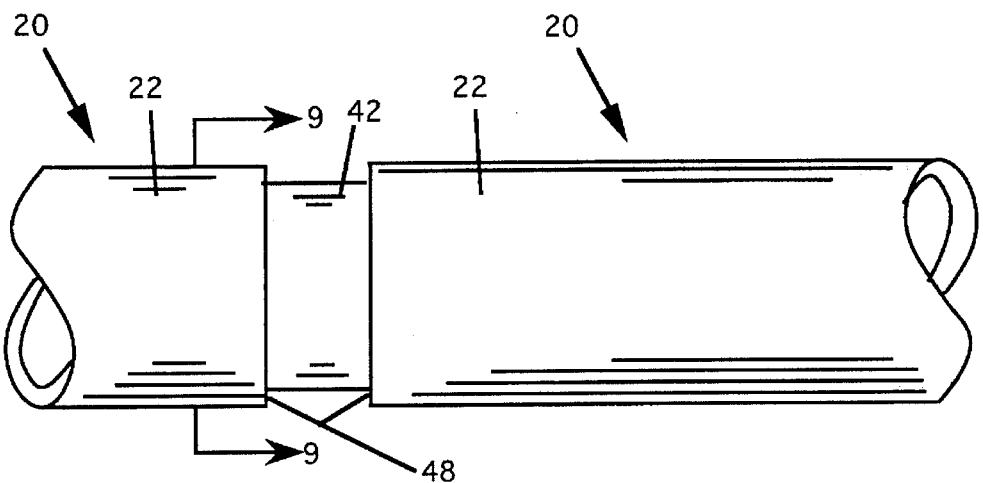
FIG. 8
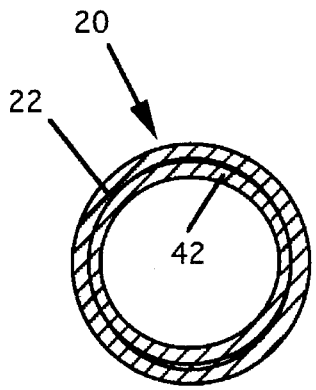
FIG. 9

5,531,044

LANDSCAPE EDGING DEVICE AND METHOD

BACKGROUND OF THE INVENTION

The present invention relates generally to a new and improved landscape edging device which is employed to define a border between adjacent earth surfaces, such as between a lawn and a garden, and more particularly to such a device employed in combination with a polymer sheet of the type employed at the base of a garden bed to retard the growth of unwanted vegetation. The invention also relates to a new and improved method for employing such a device alone or in combination with such a polymer sheet.

The prior art contains several devices employed as lawn edging or borders between lawns and gardens. The prior art also contains various means for anchoring such edging or borders to the ground, such as U.S. Pat. No. 4,846,655, issued to Gulley on Jul. 11, 1989. However, each of the prior art devices have been found wanting in one or more particulars. Specifically, installation of the devices consisted of a difficult and time-consuming burial process. First, a trench had to be dug in the shape of the border. The edging or border had to then be placed in the trench. Next, the anchoring means had to be employed. Finally, the trench had to be backfilled to partially bury the edging or border.

In addition to being a time-consuming and labor-intensive process which typically required more than one person, the installed edging or border devices routinely were forced out of the ground by frost heaves or external sources such as lawn mowers and pedestrians. Consequently, the difficult and time-consuming installation process had to be repeated at regular time intervals, requiring that the trench be redug during each reinstallation.

The present invention represents recent innovations in the art which overcome the drawbacks of the prior art by combining polyvinylchloride pipe with conventional anchor means. In addition, improved installation methods obviate the need to redig the trench during reinstallation.

SUMMARY OF THE INVENTION

It is an object of the present invention to provide an improved landscape edging device.

More specifically, it is an object of the present invention to provide an improved landscape edging device which includes an elongated member and conventional anchor means.

It is another object of the present invention to provide an improved landscape edging device which includes a polymer sheet, an elongated member and conventional anchor means.

It is a further object of the present invention to provide an improved landscape edging device in accordance with the foregoing objects wherein the elongated member comprises polyvinylchloride pipe.

It is still another object of the present invention to provide an improved landscape edging device in accordance with the foregoing objects wherein the polyvinylchloride pipe is resilient.

It is yet another object of the present invention to provide an improved landscape edging device in accordance with the foregoing objects which includes coupling means for cooperatively connecting a plurality of elongated members to each other in end-to-end fashion.

It is a further object of the present invention to provide an improved landscape edging device in accordance with the foregoing objects wherein the coupling means comprises polyvinylchloride pipe.

It is still a further object of the present invention to provide an improved landscape edging device which may easily be reset or reinstalled if it is disrupted from its installed state.

It is another object of the present invention to provide an improved landscape edging device in accordance with the present invention which is simple in design, inexpensive to manufacture, durable, and lightweight.

It is still another object of the present invention to provide an improved method of installing a landscape edging device comprising the steps of: covering a first earth surface with a polymer sheet; resting an elongated member on the ground intermediate said first earth surface and an adjacent earth surface to form a border between said first earth surface and said adjacent earth surface; and anchoring said elongated member to the ground.

It is a further object of the present invention to provide an improved method of installing a landscape edging device comprising the steps of: covering a first earth surface with a polymer sheet, a portion of said polymer sheet partially overlapping an adjacent earth surface; resting an elongated member on the ground intermediate said first earth surface and said adjacent earth surface to form a border between first earth surface and said adjacent earth surface; anchoring said elongated member to the ground; and removing said portion of said polymer sheet partially overlapping said adjacent earth surface.

It is still another object of the present invention to provide an improved method of installing a landscape edging device comprising the steps of: digging a trench in the ground intermediate a first earth surface and an adjacent earth surface; covering said first earth surface with a polymer sheet; resting an elongated member on the ground intermediate said first earth surface and said adjacent earth surface to form a border between said first earth surface and said adjacent earth surface; and anchoring said elongated member to the ground.

It is yet another object of the present invention to provide an improved method of installing a landscape edging device comprising the steps of: digging a trench in the ground intermediate a first earth surface and an adjacent earth surface; covering said first earth surface with a polymer sheet, a portion of said polymer sheet partially overlapping said adjacent earth surface; resting an elongated member on the ground intermediate said first earth surface and said adjacent earth surface to form a border between said first earth surface and said adjacent earth surface; anchoring said elongated member to the ground; and removing said portion of said polymer sheet partially overlapping said adjacent earth surface.

A broad aspect of the invention involves an improved landscape edging device. The device includes, in combination with a first earth surface and an adjacent earth surface forming a border between the first earth surface and the adjacent earth surface, an elongated member resting substantially horizontally on the ground intermediate the first earth surface and the adjacent earth surface, and anchor means for anchoring the elongated member to the ground.

A somewhat more limited aspect of the invention involves a polyvinylchloride pipe having longitudinally spaced bores extending vertically therethrough perpendicular to the longitudinal axis of the polyvinylchloride pipe and spikes disposed to extend substantially vertically through the bores and into the ground. The spikes include head portions and shank portions. The head portions have larger outer head diameters than the diameters of the bores and the shank portions have outer shank diameters smaller than the diameters of the bores, whereby the bores are adapted to receive the shank portions and the head portions cooperatively engage the elongated member proximate the corresponding bores.

Another aspect of the invention involves a method of installing a landscape edging device. The first step involves digging a trench in the ground intermediate a first earth surface and an adjacent earth surface. The second step involves covering the first earth surface with a polymer sheet, preferably with a portion of the polymer sheet partially overlapping the adjacent earth surface. The third step involves resting an elongated member on the ground intermediate the first earth surface and the adjacent earth surface to form a border between the first earth surface and the adjacent earth surface. The next step involves anchoring the elongated member to the ground. The final step involves removing the portion of the polymer sheet partially overlapping the adjacent earth surface, if applicable.

Other objects, features, capabilities and advantages are comprehended by the invention, as will later appear and as are inherently possessed thereby.

BRIEF DESCRIPTION OF THE DRAWINGS

FIG. 6 is a side elevation of a coupling means constructed according to the principles of the present invention;

FIG. 7 is a cross-sectional view of coupling means taken along line 7—7 of FIG. 6;

FIG. 8 is a side elevational view of two elongated members cooperatively connected to each other in end-to-end fashion by coupling mean captively inserted into respective facing ends of the elongated members;

FIG. 9 is a cross-sectional view of an elongated member and coupling means taken along line 9—9 of FIG. 8 illustrating the cooperation between the elongated member and the coupling means.

Corresponding reference numerals indicate corresponding parts throughout the several views of the drawings.

DETAILED DESCRIPTION OF THE PREFERRED EMBODIMENT

Figure 1:
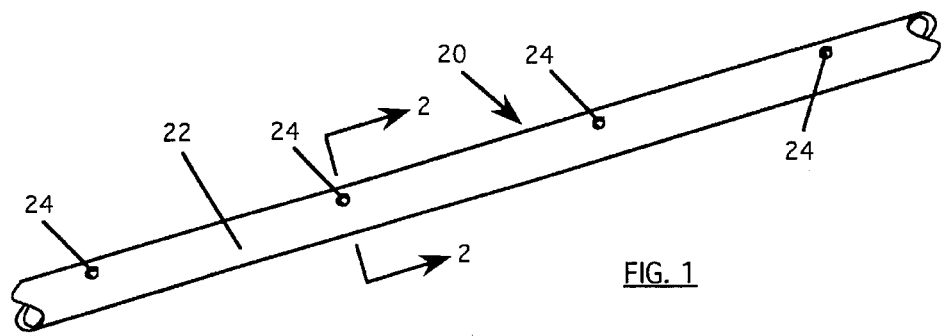
FIG. 1 is a perspective view of an elongated member constructed according to the principles of the present invention illustrating longitudinally spaced bores.

Referring now to the drawings in detail there is illustrated a landscape edging device constructed in accordance with the principles of the present invention and designated generally in its entirety by the reference numeral 10 in FIGS. 4, 5, 12, 13, 16 & 17. Landscape edging device 10 of the present invention contains an elongated member resting substantially horizontally on the ground and designated generally by the reference numeral 20 in FIGS. 1, 2, 4, 5, 8, 9, 12, 13, 16 & 17 in combination with an anchor means 30 comprising a plurality of spikes designated generally by reference numeral 31 in FIGS. 3, 4, 5, 12, 13, 16 & 17.

In the preferred embodiment shown in FIGS. 1–9, 12, 13, 16 & 17, elongated member 20 comprises polyvinylchloride pipe 22 provided with a plurality of longitudinally spaced bores 24 adapted to receive vertically therethrough a plurality of spikes 31. Polyvinylchloride pipe 22 is commonly referred to as PVC pipe and is of the type commercially available from numerous sources. However, polyvinylchloride pipe 22 preferably is resilient enough to be bent at an angle of up to 15 degrees along its longitudinal axis without plastic deformation. It will be appreciated by those skilled in the art that elongated member 20 may take on various other shapes, sizes and compositions without departing from the spirit and scope of the present invention. In particular, elongated member 20 may be cylindrical, tubular, hexagonal, rectangular or oval. As other alternatives, elongated member 20 may be solid or hollow and may be composed of wood, aluminum, rubber or various other conventional materials.

Figure 2:
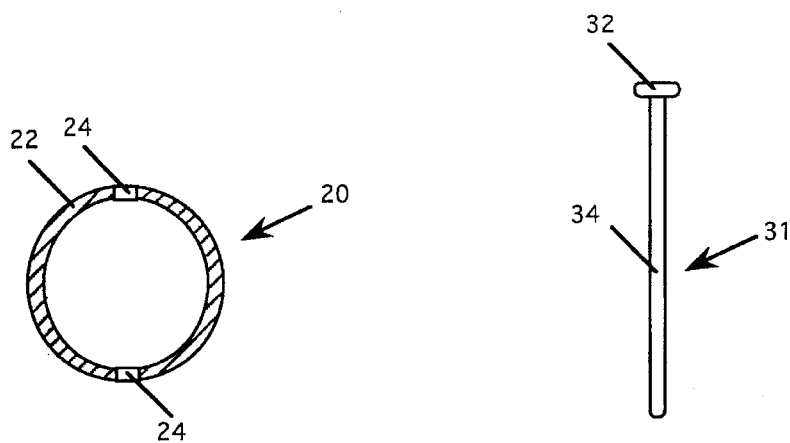
FIG. 2 is an enlarged cross-sectional view of an elongated member taken along line 2—2 of FIG. 1 illustrating the bores.
Figure 3:
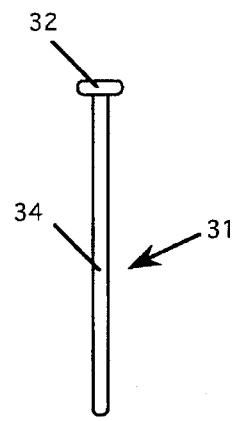
FIG. 3 is a side elevation view of a spike constructed according to the principles of the present invention.
Figure 4:
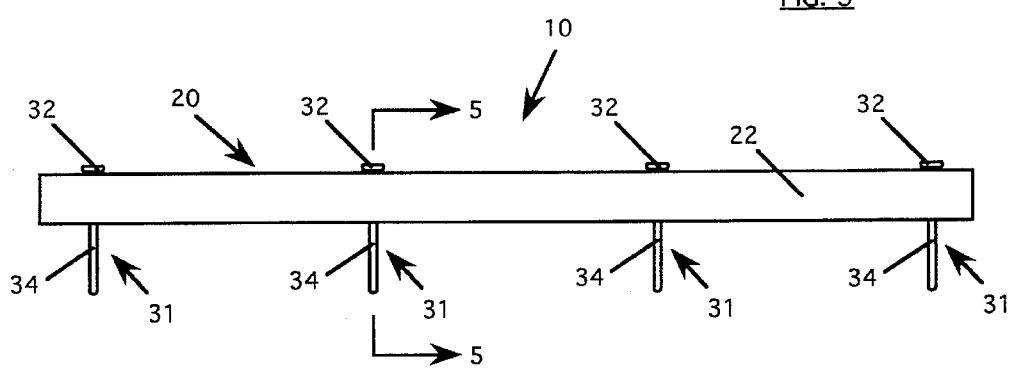
FIG. 4 is a side elevation view of an elongated member and spikes constructed according to the principles of the present invention illustrating the cooperation of the spikes with the elongated member.

FIGS. 1 & 2 illustrate bores 24 extending vertically through elongated member 20 of the preferred embodiment perpendicular to the longitudinal axis of polyvinylchloride pipe 22. Bores 24 may be formed integral with elongated member 20 or formed prior to or during installation, such as by drilling or punching.

FIGS. 3, 4, 5, 12, 13, 16 & 17 illustrate spikes 31. Although one or more spikes 31 are the preferred anchor means 30 of the present invention, it will be appreciated by those skilled in the art that any conventional anchor means will suffice. Spikes 31 include head portions 32 and shank portions 34. Head portions 32 have outer head diameters 36 larger than diameters 38 of bores 24 and shank portions 34 have outer shank diameters 39 smaller than diameters 38 of bores 24. In operation, one or more spikes 31 are disposed to extend substantially vertically through bores 24 with head portions 32 of spikes 31 cooperatively engaging the top of elongated member 20 proximate bores 24 and shank portions 34 being received through bores 24 and being driven into the ground to secure elongated member 20 to the ground.

Figure 5:
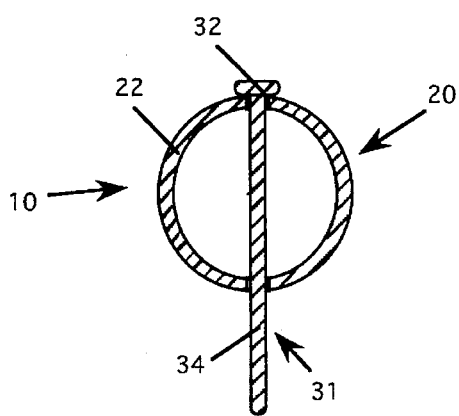
FIG. 5 is an enlarged cross-sectional view of an elongated member and a spike taken along line 5—5 of FIG. 4 illustrating the cooperation between the spike and a bore.

FIG. 5 illustrates the cooperation between a spike 31 and bores 24 of elongated member 20.

Landscape edging device 10 may include coupling means 40. Preferred coupling means 40 comprises one or more cylindrical members 42, as illustrated in FIGS. 6–9. Cylindrical members 42 have outer cylindrical diameters 44 and elongated members 20 have inner diameters 46 sized such that a plurality of elongated members 20 may be cooperatively connected to each other in end-to-end fashion by captively inserting one or more cylindrical members 42 into respective facing ends 48 of elongated members 20. A solvent may be employed between the mating surfaces to bond same so as to join elongated members 20 together; otherwise adhesives, welding or gasketing may be employed. In alternative embodiments, cylindrical members 42 may also include angles such as 15, 30, 45, 60, 75, 90 degrees, or any other angles, so that connected elongated members 20 may form a border following the circumference of a garden In the preferred embodiment, landscape edging device 10 includes a polymer sheet 50, as illustrated in FIGS. 11–13 & 15–17. It will be understood by those skilled in the art that any of a variety of polymer sheets available commercially from several sources may be used in connection with the present invention.

While the invention has been described in connection with a preferred embodiment, it will be understood that it is not intended that the invention be limited to that embodiment. On the contrary, it is intended to cover all alternatives, modifications and equivalents as may be included within the spirit and scope of the invention as defined by the appended claims.

METHOD

Figure 10:
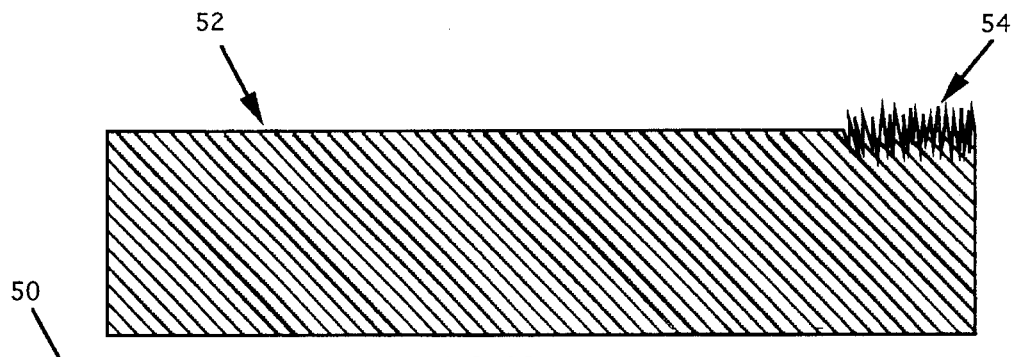
FIG. 10 is a side elevation of the ground comprising a first earth surface and an adjacent earth surface.
Figure 11:
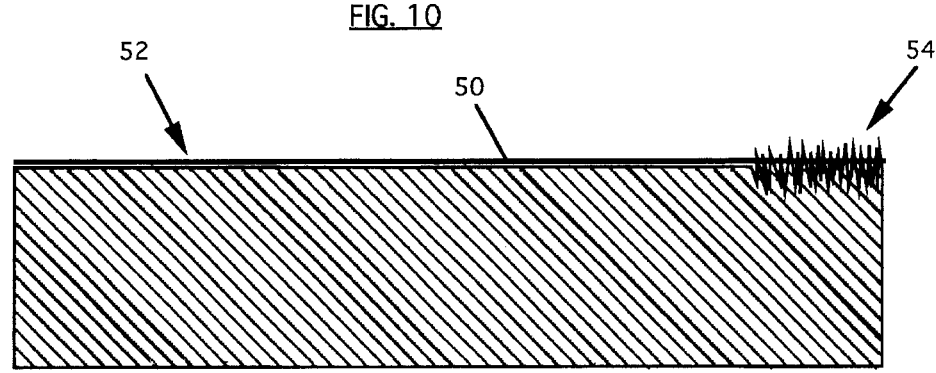
FIG. 11 is a side elevation of the ground comprising a first earth surface and an adjacent earth surface illustrating a polymer sheet covering the first earth surface and the adjacent earth surface.
Figure 12:
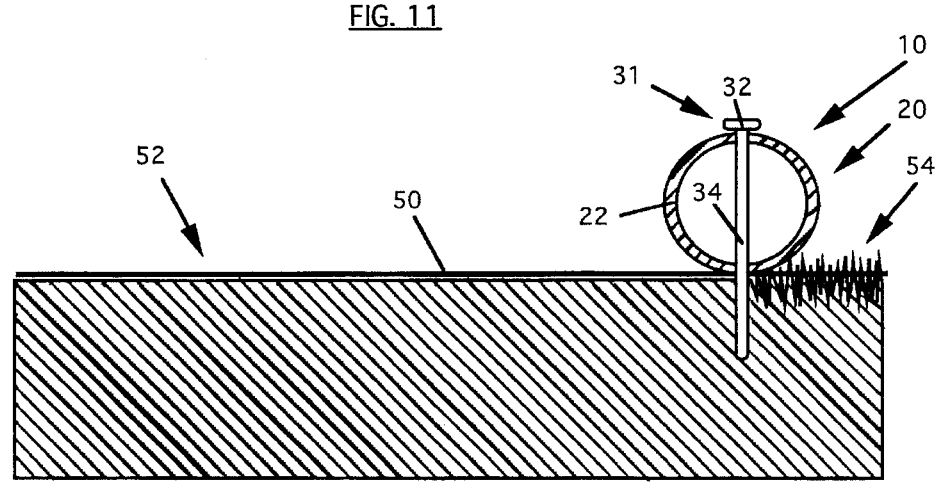
FIG. 12 is a side elevation of the ground comprising a first earth surface and an adjacent earth surface illustrating a polymer sheet covering the first earth surface and the adjacent earth surface, and also illustrating a cross-sectional view of an elongated member resting on the ground intermediate the first earth surface and the adjacent earth surface and the cooperation of a spike received through bores of the elongated member.
Figure 13:
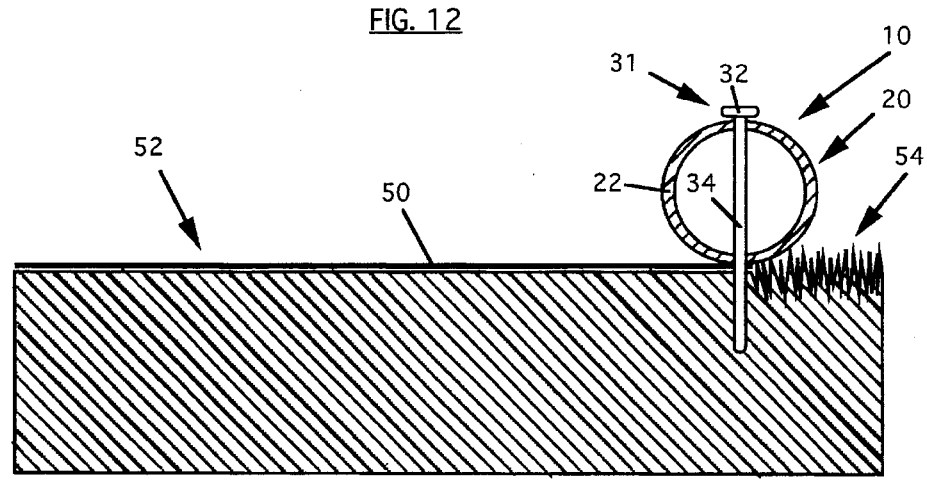
FIG. 13 is a side elevation of the ground comprising a first earth surface and an adjacent earth surface illustrating a polymer sheet covering the first earth surface with the portion of the polymer sheet overlapping the adjacent earth surface having been removed, and also illustrating a cross-sectional view of an elongated member resting on the ground intermediate the first earth surface and the adjacent earth surface and the cooperation of a spike received through bores of the elongated member.

FIG. 10 illustrates a first earth surface designated generally by reference numeral 52 and an adjacent earth surface designated generally by reference numeral 54. In operation, first earth surface 52 is prepared by leveling same and then covering first earth surface 52 with polymer sheet 50, as illustrated in FIG. 11, to retard the growth of unwanted vegetation. Preferably, a portion of polymer sheet 50 partially overlaps adjacent earth surface 54, as illustrated in FIG. 11, although it may be pre-cut to terminate along the intersection of first earth surface 52 and adjacent earth surface 54. Elongated member 20 is then rested on the ground intermediate first earth surface 52 and adjacent earth surface 54 and on the polymer sheet 50 to form a border between first earth surface 52 and adjacent earth surface 54. The next step involves anchoring elongated member 20 to the ground by use of anchor means 30. Using the preferred embodiment comprising polyvinylchloride pipe 22 and spikes 31, this step comprises driving spikes 31 vertically through bores 24 and into the ground by hand, foot, hammer, mallet, or the like. FIG. 12 illustrates the preferred embodiment with elongated member 20 resting on polymer sheet 50 and the ground, and also illustrates spike 31 having been driven through bores 24 and into the ground. The final step involves removing the portion of polymer sheet 50, if any, partially overlapping adjacent earth surface 54. FIG. 13 illustrates the invention as installed using this preferred method.

Figure 14:
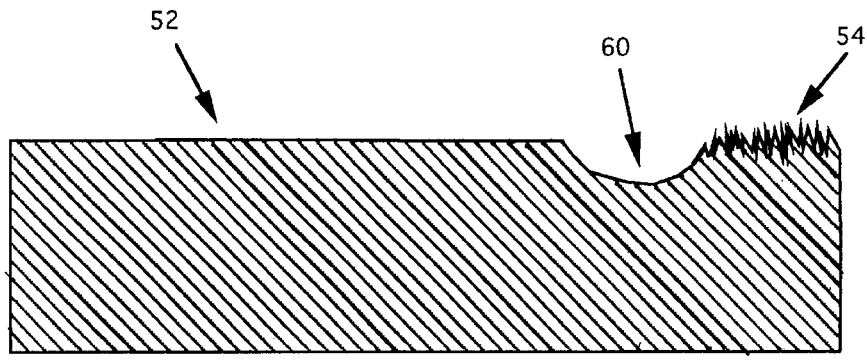
FIG. 14 is a side elevation of the ground comprising a trench intermediate a first earth surface and an adjacent earth surface.
Figure 15:
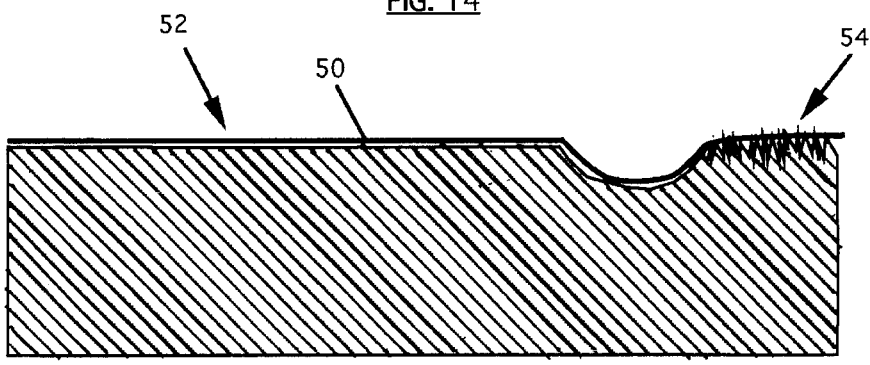
FIG. 15 is a side elevation of the ground comprising a trench intermediate a first earth surface and an adjacent earth surface illustrating a polymer sheet covering the first earth surface and the adjacent earth surface.
Figure 16:
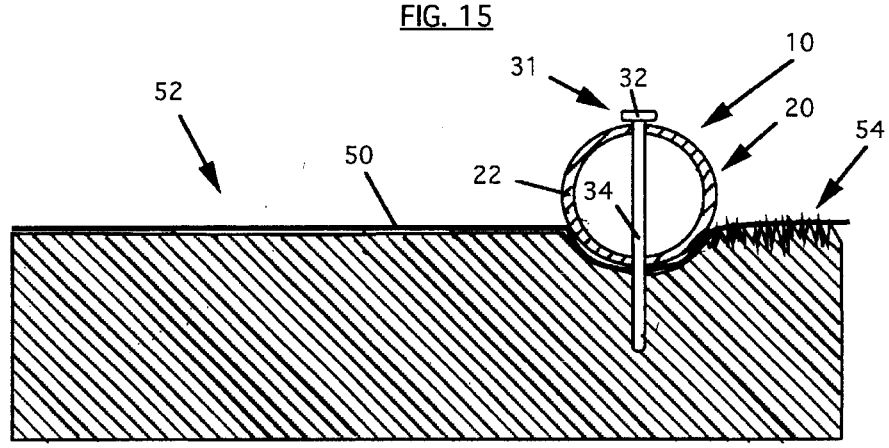
FIG. 16 is a side elevation of the ground comprising a trench intermediate a first earth surface and an adjacent earth surface illustrating a polymer sheet covering the first earth surface and the adjacent earth surface, and also illustrating a cross-sectional view of an elongated member resting on the ground intermediate the first earth surface and the adjacent earth surface and the cooperation of a spike received through bores of the elongated member.
Figure 17:
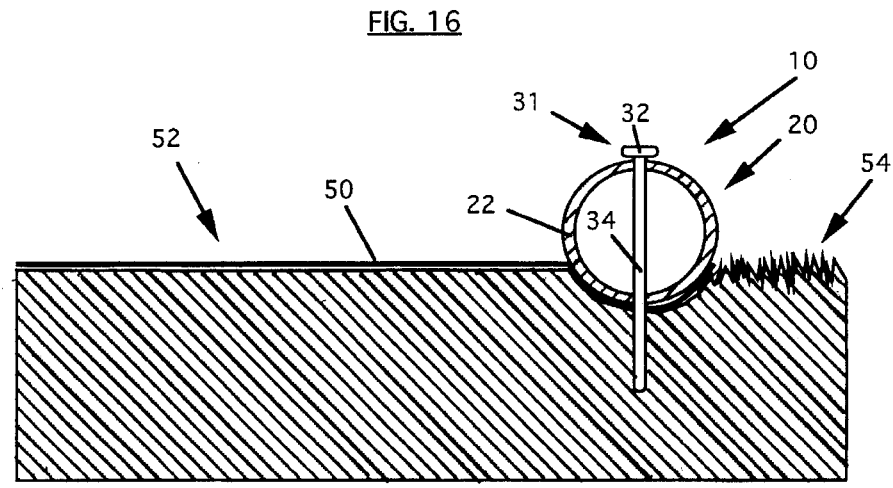
FIG. 17 is a side elevation of the ground comprising a trench intermediate a first earth surface and an adjacent earth surface illustrating a polymer sheet covering the first earth surface with the portion of the polymer sheet overlapping the adjacent earth surface having been removed, and also illustrating a cross-sectional view of an elongated member resting on the ground intermediate the first earth surface and the adjacent earth surface and the cooperation of a spike received through bores of the elongated member.
Figure 18:
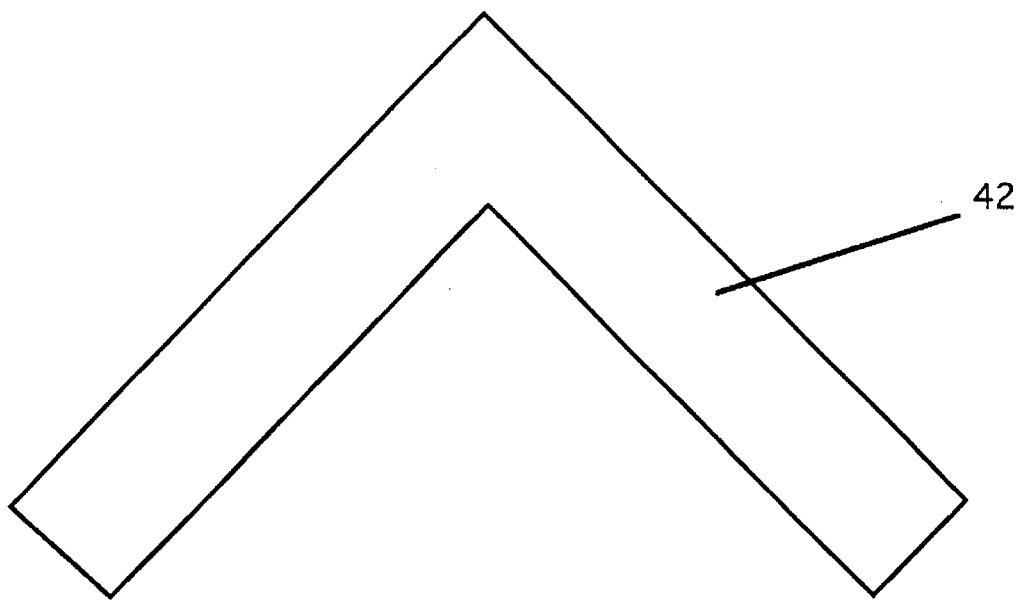
FIG. 18 is a top elevation of a cylindrical member including a 90 degree angle.
Figure 19:
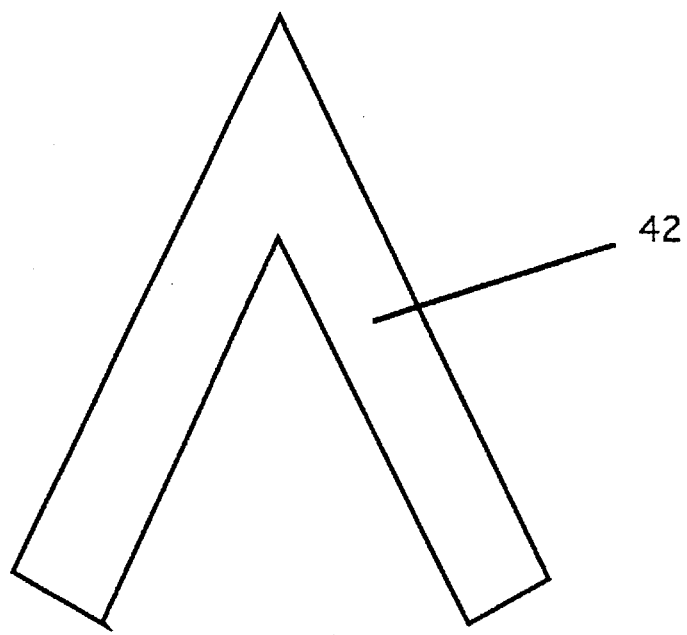
FIG. 19 is a top elevation of a cylindrical member including a 45 degree angle.

Alternatively, as an initial step, a trench, as designated generally by reference numeral 60 in FIG. 14, may be dug intermediate first earth surface 52 and adjacent earth surface 54. When positioned, elongated member 20 then rests in trench 60. FIGS. 15, 16, & 17 illustrate the steps of covering first earth surface 50 with polymer sheet 50 to retard the growth of unwanted vegetation, resting elongated member 20 on the ground intermediate first earth surface 52 and adjacent earth surface 54 and on polymer sheet 50 to form a border between first earth surface 52 and adjacent earth surface 54, anchoring elongated member 20 to the ground by use of spikes 31, and removing the portion of polymer sheet 50, if any, partially overlapping adjacent earth surface 54. FIG. 17 illustrates the invention as installed using this alternative method. Using either method, spikes 31 may be inserted in bores 24 prior to positioning elongated member 20 on the ground or they may be partially inserted at the time elongated member 20 is rested upon the ground and then forced into the ground by hand, foot, hammer, mallet, or the like.

In view of the above, it will be seen that the several objects of this invention are achieved and other advantageous results are obtained.

I claim:

1. In combination with a first earth surface and an adjacent earth surface, forming a border between said first earth surface and said adjacent earth surface, a landscape edging device comprising, in combination:

a substantially cylindrical elongated member resting substantially horizontally on the ground intermediate said first earth surface and said adjacent earth surface, said substantially cylindrical elongated member having one or more longitudinally spaced bores extending substantially vertically therethrough;

and anchor means for anchoring said substantially cylindrical elongated member to the ground, said anchor means comprising one or more corresponding spikes disposed to extend substantially vertically through said bores, said spikes having head portions and shank portions, said head portions adapted to cooperatively engage said substantially cylindrical elongated member.

2. The device of claim 1 wherein said substantially cylindrical elongated member is substantially tubular.

3. The device of claim 2 wherein said substantially cylindrical elongated member is comprised of polyvinyl chloride pipe.

4. The device of claim 3 wherein said polyvinyl chloride pipe is resilient.

5. The device of claim 1 wherein each of said head portions has an outer head diameter larger than the diameter of said bores and each of said shank portions has an outer shank diameter smaller than said diameter of said bores, whereby said bores are adapted to receive said shank portions and said head portions cooperatively engage said elongated member proximate said corresponding bores.

6. The device of claim 1 further comprising a plurality of elongated members and a coupling means for cooperatively connecting said members to each other in end-to-end fashion.

7. The device of claim 6 wherein said elongated members are substantially tubular having inner diameters and said coupling means comprises one or more substantially cylindrical members having outer cylindrical diameters, said cylindrical members being adapted and sized to be captively inserted into respective ends of said elongated members, whereby said elongated members are cooperatively connected to each other in end-to-end fashion.

8. The device of claim 7 wherein said cylindrical members further comprise angles.

9. The device of claim 1 further comprising a polymer sheet covering said first earth surface, said elongated member resting on said polymer sheet.

* * * * *